(12) United States Patent
Halderman

(10) Patent No.: US 6,571,494 B1
(45) Date of Patent: Jun. 3, 2003

(54) ANIMAL IDENTIFICATION TAG

(76) Inventor: G. Alan Halderman, 310 S. Main St., Eldorado, OH (US) 45321

(*) Notice: Subject to any disclaimer, the term of this patent is extended or adjusted under 35 U.S.C. 154(b) by 0 days.

(21) Appl. No.: 10/251,164

(22) Filed: Sep. 20, 2002

Related U.S. Application Data

(63) Continuation-in-part of application No. 29/141,225, filed on May 3, 2001, now Pat. No. Des. 463,630.

(51) Int. Cl.⁷ ................................................. G09F 3/00
(52) U.S. Cl. ........................................... 40/301; 40/300
(58) Field of Search .......................... 40/300, 301, 302, 40/303, 304

(56) References Cited

U.S. PATENT DOCUMENTS

| | | | | |
|---|---|---|---|---|
| 3,360,877 A | * | 1/1968 | Estep | 40/300 |
| 3,650,058 A | * | 3/1972 | Wittcke et al. | 40/300 |
| 4,612,877 A | * | 9/1986 | Hayes et al. | 40/301 |
| 4,920,671 A | * | 5/1990 | Zatkos | 40/301 |
| 5,473,830 A | | 12/1995 | Doble | |
| 6,055,752 A | * | 5/2000 | Ritchey | 40/301 |

OTHER PUBLICATIONS

NASCO Catalog, Mar. 2001, pp. 6, 8, 9, 10, 11.*

* cited by examiner

*Primary Examiner*—Gary Hoge
(74) *Attorney, Agent, or Firm*—Jacox, Meckstroth & Jenkins

(57) ABSTRACT

A generally flat panel of molded flexible plastics material has an upper portion adapted to be attached by a male stud to an animal's ear. A lower portion of the panel has a plurality of apertures arranged in a pattern of a plurality of three digital eights. Digital number elements have rearwardly projecting portions which snap-fit into the apertures for releasably retaining the elements, and the elements have a contrasting color to form a selected digital number between "0" and "9" for each digital eight. Some of the digital number elements are molded in a color contrasting wit the color of the panel and other number elements are molded with the same color as the panel.

18 Claims, 2 Drawing Sheets

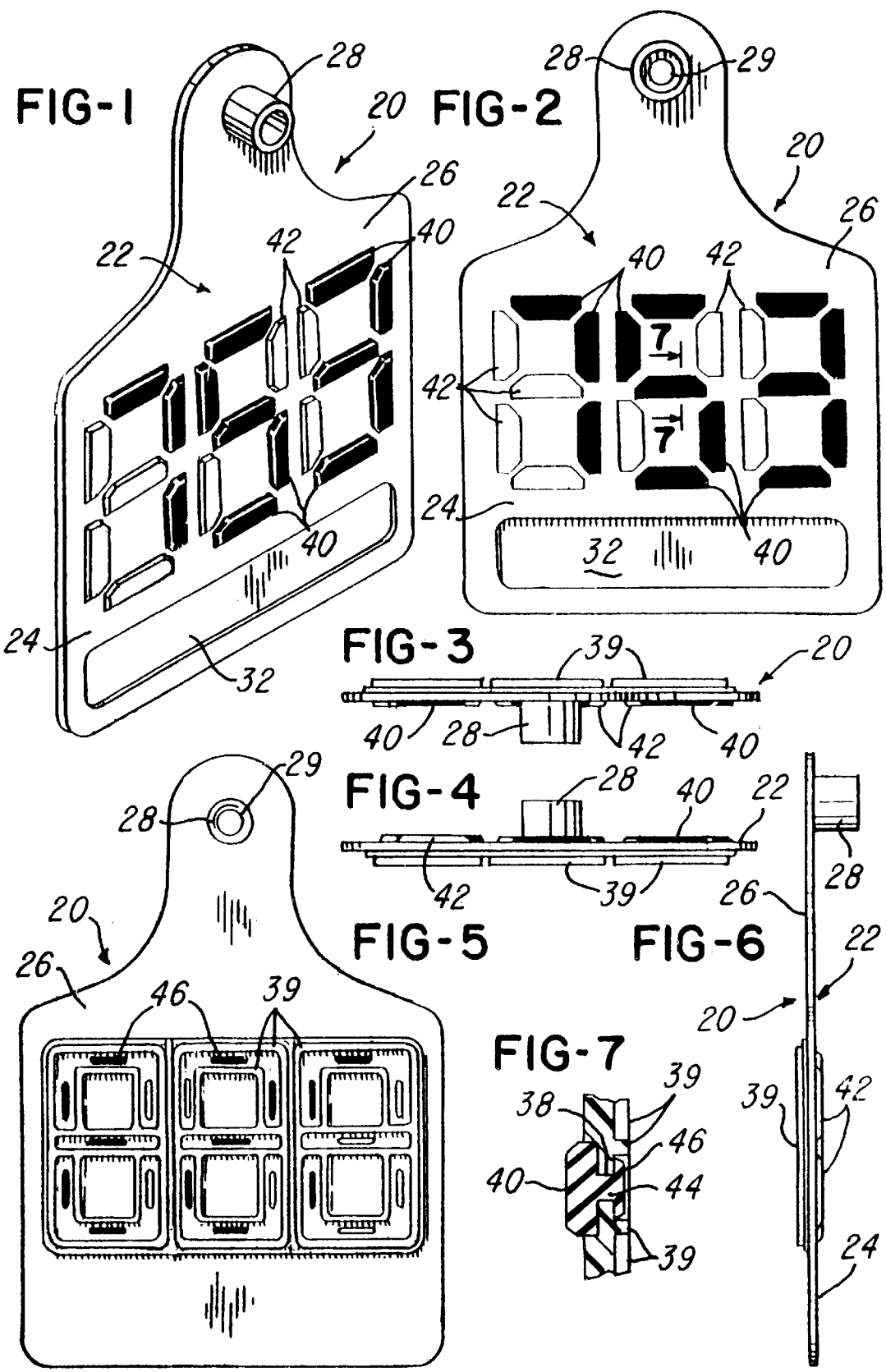

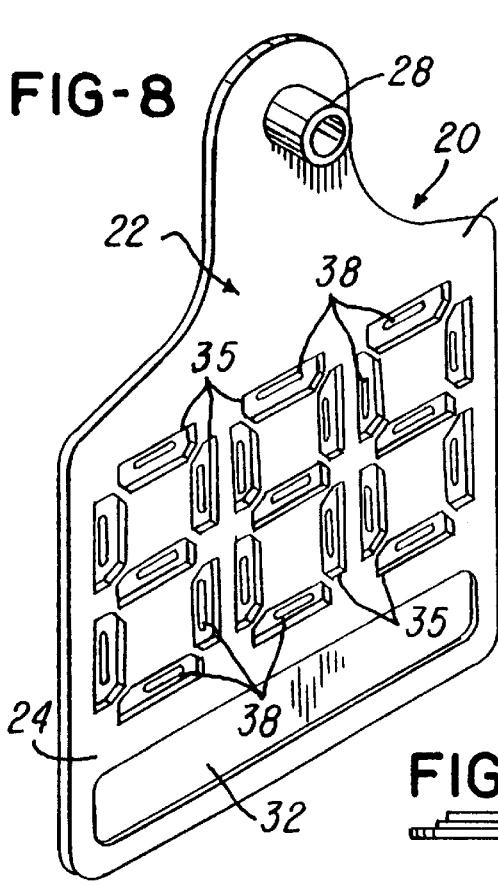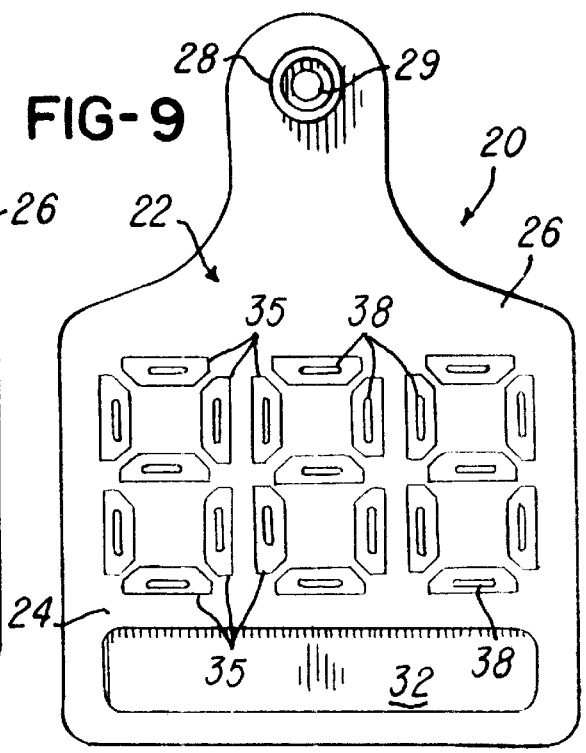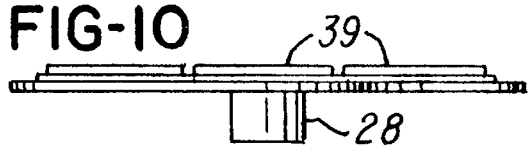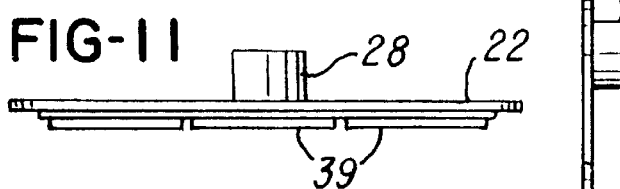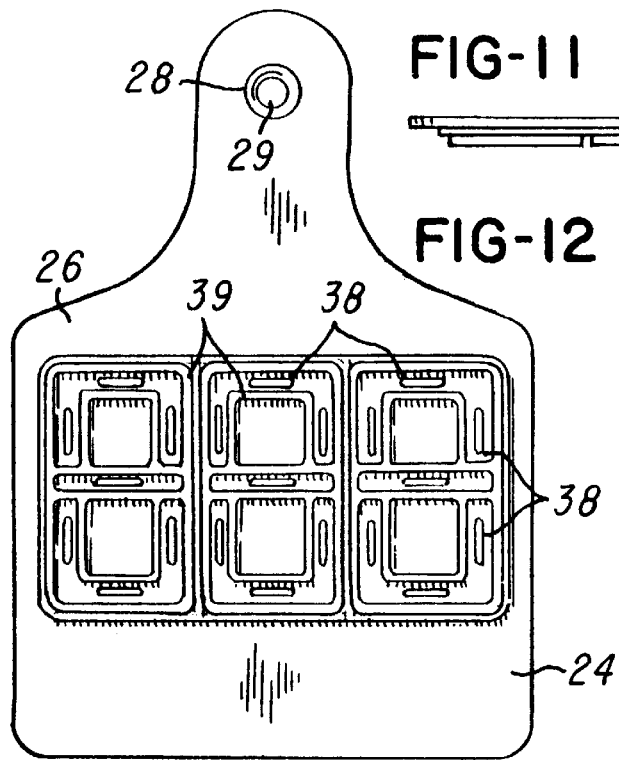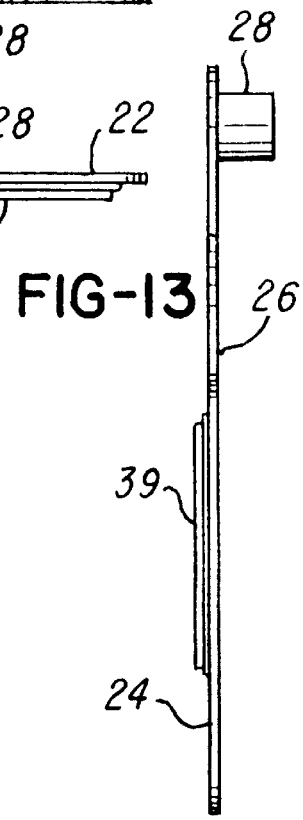

ns shown in FIGS. 1 and 2;

ANIMAL IDENTIFICATION TAG

BACKGROUND OF THE INVENTION

In the identification of animals, one from another, it is common to use identification tags with different numbers hot-stamped on a molded plastic tag or to mark the numbers on blank tags with a marking pen. For example, blank tags and pre-numbered hot-stamped tags in various colors are sold under the trademark ALLFLEX, and some of the tags are attached to an animal's ear with a pointed male stud which extends through a hole in the ear formed by a hand actuated punch. Blank tags and prenumbered tags are also sold under the trademark DUFLEX and under the trademarks RITCHEY, TUFF-FLEX and Y-TEX. While the pre-numbered hot-stamped identification tags are able to withstand sun and inclement weather, the tags must be ordered with predetermined preprinted numbers or a large inventory of tags with different numbers must be maintained for use with a number of animals. On the other hand, while the blank identification tags may be numbered with a marking pen as desired, it has been found that the marking pen ink fades under ultraviolet light from the sun or after a period of use in different types of inclement weather. Another form of animal identification or information tag is disclosed in U.S. Pat. No. 5,473,830. This patent discloses an ear tag molded of a plastics material and having raised numbers in the form of digital eights. A portion of the top surface of each "8" is marked with an indelible ink to provide a number between "0" and "9", or in the alternative, a portion of the digital bars may be cut away to convert each "8" into a digital number between "0" and "9".

SUMMARY OF THE INVENTION

The present invention is directed to an improved identification tag which provides for a clearly readable and selectable number and which does not require prenumbering by hot stamping the tag with the number or marking the number with a fadable ink of a marking pen. The identification tag of the invention also assures that the selected identification number remains in tact regardless of abuse by the animal and regardless of the weather conditions. In accordance with one embodiment of the invention, a generally flat body or panel is molded of a pliable plastics material and has a generally square lower portion and an upwardly projecting narrow tab portion adapted to be fastened or attached to an animal's ear by means of a pointed male stud projecting through a hole within the ear.

The lower portion of the molded panel has a plurality of apertures arranged in a pattern of a plurality of digital eights, and the apertures are preferably in the form of a slot through the panel. A plurality of molded elongated bars or digital number elements each has a trapezoid configuration and a projecting integral tab which is adapted to extend through a corresponding aperture in the panel to form a snap-fit connection with the panel. At least some of the digital number elements contrast in color with the color of the panel to provide a clearly readable selected digital number. Preferably, each digital bar or number element seats within a correspondingly-shaped recess within the front surface of the panel, and the rearwardly projecting tab of the element is enclosed by rearwardly projecting adjacent ribs to assure that the number element is not accidentally released or ejeected during use of the identification tag on an animal.

Other features and advantages of the invention will be apparent from the following description, the accompanying drawings and the appended claims.

BRIEF DESCRIPTION OF THE DRAWINGS

FIG. 1 is a perspective view of an animal identification tag constructed in accordance with the invention and illustrating the digital number of "753";

FIG. 2 is a front view of the tag shown in FIG. 1;

FIG. 3 is a top view of the identification tags shown in FIGS. 1 and 2;

FIG. 4 is a bottom view of the identification tag shown in FIGS. 1 and 2;

FIG. 5 is a rear view of the identification tag shown in FIGS. 1 and 2;

FIG. 6 is an edge view of the identification tag shown in FIGS. 1–5;

FIG. 7 is an enlarged fragmentary section taken on the line 7—7 of FIG. 2; and

FIGS. 8–13 are views corresponding to FIGS. 1–6 of the identification tag and without the digital number elements which are shown inserted in FIGS. 1–6.

DESCRIPTION OF THE PREFERRED EMBODIMENT

FIG. 1 illustrates an animal identification tag 20 which includes a generally flat body or panel 22 having the general shape of a MAXI Tag sold under the above-mentioned trademark ALLFLEX. The panel 22 is adapted to be attached to an animal's ear and is molded of a flexible or pliable thermoplastics material. The panel 22 has a generally rectangular lower portion 24 and an upwardly projecting tab or attachment portion 26 with an integrally molded tubular projection 28. The panel has a hole 29 aligned with the tubular projection for receiving a fastener in the form of a male stud (not shown) having an enlarged pointed head portion adapted to extend through a punched hole within an animal's ear and snap-fit into the tubular projection 28.

In accordance with the present invention, the lower portion 24 of the panel 22 is molded with a shallow elongated bottom recess or cavity 32 which provides a recessed surface for printing desired information concerning the animal. The panel 22 is also molded with a plurality of elongated shallow cavities or recesses 35 (FIG. 8) which are arranged in a pattern to form a plurality or three digital eights or "8". A slot 38 extends through the panel 22 from the bottom of each cavity or recess 35, and the back surface of the panel 22 is molded with a pattern of rectangular ribs 39 which extend parallel to each slot 38 on opposite sides of the slot, as shown in FIGS. 5 & 12.

Each of the recesses or cavities 35 is adapted to receive a bar in the form of a digital number element 40 or 42 each of which has the same trapezoid shape as the cavity 35. Each of the elements 40 and 42 has a rearwardly projecting tab 44 (FIG. 7) which has the same length as the corresponding slot 38 and includes a wedge-shaped tapered head portion 46 so that the projection or tab 44 snap-fits into the corresponding slot 38 when the digital number element 40 or 42 is pressed into or inserted in its corresponding recess or cavity 35. Each of the number elements 40 and 42 are molded of relatively hard plastics material, harder than the material forming the panel 22, and the element may also be removed from its recess 35 and attachment to the panel 22 by pressing on the head portion 46 of the element.

As shown in FIGS. 1 and 2, the number elements 42 are molded of a plastics material having the same color as the panel 22 which is preferably white or off-white. The number elements 40 are molded of a darker color plastics material such as dark brown or black. Thus by arranging the digital number elements 40 and 42 within the cavities 35, a digital number may be selected between "000" and "999". For example, the numbers "753" is illustrated on the tag 20 in FIGS. 1 and 2. As shown in FIG. 7, the ribs 42 protect the projecting tabs 44 of the number elements 40 and prevent a head portion 46 from being accidentally severed or worn off, which would allow the number element to be released from the panel 22.

From the drawings and the above description, it is apparent that an animal identification tag constructed in accordance with the present invention provides desirable features and advantages. For example, the construction of the panel 22 with the arrangement of the apertures or slots 38 permits the digital number elements 40 and 42 to be affixed to the panel 22 in any selected arrangement to provide for selecting a number between "0" and "999". In addition, since the digital number elements 40 are molded of a dark contrasting material, the selected digital number may be easily read and will not fade or wear off after an extended period of use in all types of weather. Furthermore, the recesses or cavities 35 for the digital number elements 40 and 42 also help protect the number elements and prevent them from being sheared or peeled off of the panel 22 by an abrasive action. In addition, the snap-in projections 44 of the digital number elements 40 and 42 provide a positive connection of the number elements to the support panel 22 while also permitting the number elements to be removed for reuse in making another digital number. As mentioned above, the rearwardly projecting ribs 42 also protect the tapered head portions 46 of the projections 44 and prevent them from being sheared off or severed from the projections 44.

While the form of identification tag herein described constitutes a preferred embodiment of the invention, it is to be understood that the invention is not limited to this precise form of tag, and that changes may be made therein without departing from the scope and spirit of the invention as defined in the appended claims.

What is claimed is:

1. An identification tag adapted for use on an animal, comprising a generally flat panel of a molded material and having a portion adapted to be fastened to the animal, a plurality of apertures within said panel and arranged in a pattern forming a plurality of digital eights, a plurality of elongated digital number elements each having an integral connecting portion forming a snap-fit connection within a corresponding said aperture, and at least some of said digital number elements contrasting in color with a color of said panel to provide a clearly readable selected digital number.

2. A tag as defined in claim 1 wherein each of said elongated digital number elements has a trapezoid configuration.

3. A tag as defined in claim 1 wherein said panel defines an elongated recess for each of said digital number elements, and each recess has substantially the same shape as said number element for precisely locating and protecting said number element.

4. A tag as defined in claim 1 wherein each of said digital number elements projects from a front surface of said panel and is removable from said panel.

5. A tag as defined in claim 1 wherein each of said apertures extends through said panel, and said connecting portion of each said digital number element projects rearwardly from a back surface of said panel.

6. A tag as defined in claim 1 wherein each of said apertures and said connecting portion of each of said digital number elements is elongated, and each of said connecting portions has a head portion larger than the corresponding said aperture to form said snap-fit connection.

7. A tag as defined in claim 1 wherein said integral connecting portion of each of said digital number elements has a head portion projecting through the corresponding said aperture, and said head portion is larger than said aperture to form said snap-fit connection.

8. A tag as defined in claim 1 wherein said panel and said digital number elements are molded of different plastics material having different colors with the color of at least some of said digital number elements contrasting with the color of said panel.

9. A tag as defined in claim 8 wherein at least some of said digital number elements have substantially the same color as the color of said panel.

10. A tag as defined in claim 1 wherein said panel has a generally square lower portion having said apertures and said digital number elements, and said integral portion adapted to be fastened to an animal being an upper portion substantially smaller than said lower portion.

11. A tag as defined in claim 10 wherein said panel defines an elongated cavity within said lower portion of said panel and under said number elements.

12. An identification tag adapted for use on an animal, comprising a generally flat panel of a molded material and having a portion adapted to be fastened to the animal, a plurality of apertures extending through said panel and arranged in a pattern forming a plurality of digital eights, a plurality of elongated digital number elements each having an integral connecting portion projecting through a corresponding said aperture and having an enlarged head portion forming a snap-fit connection with said panel, and at least some of said digital number elements contrasting in color with a color of said panel to provide a clearly readable selected digital number.

13. A tag as defined in claim 12 wherein each of said elongated digital number elements has a trapezoid configuration.

14. A tag as defined in claim 12 wherein said panel defines an elongated recess for each of said digital number elements, and each recess has substantially the same shape as said number element for precisely locating and protecting said number element.

15. A tag as defined in claim 12 wherein each of said digital number elements projects from a front surface of said panel and is removable from said panel.

16. A tag as defined in claim 12 wherein each of said apertures and said connecting portion of each of said digital number elements is elongated, and each of said connecting portions has an elongated head portion larger than the corresponding said aperture to form said snap-fit connection.

17. A tag as defined in claim 12 wherein at least some of said digital number elements have substantially the same color as the color of said panel.

18. A tag as defined in claim 12 wherein said panel has a generally square lower portion having said apertures and said digital number elements, and said integral portion adapted to be fastened to an animal being an upper portion substantially smaller than said lower portion.

* * * * *